(12) United States Patent
Richardson

(10) Patent No.: US 6,715,206 B2
(45) Date of Patent: Apr. 6, 2004

(54) METHOD AND APPARATUS FOR ACCURATELY DETERMINING THE AMOUNT OF METAL TO BE REMOVED FROM A STROKED ENGINE BLOCK

(76) Inventor: Mark Richardson, 2561 Hwy. 166 East, Carrollton, GA (US) 30117

( * ) Notice: Subject to any disclaimer, the term of this patent is extended or adjusted under 35 U.S.C. 154(b) by 0 days.

(21) Appl. No.: 10/121,748

(22) Filed: Apr. 12, 2002

(65) Prior Publication Data
US 2003/0056354 A1 Mar. 27, 2003

Related U.S. Application Data
(60) Provisional application No. 60/283,676, filed on Apr. 13, 2001.

(51) Int. Cl.[7] ................................. B23P 11/00
(52) U.S. Cl. .................. 29/888.06; 29/404; 29/407.05; 29/702; 29/705
(58) Field of Search .............. 29/404, 407.05, 29/888.06, 888.011, 701, 702, 705

(56) References Cited

U.S. PATENT DOCUMENTS

| | | | | |
|---|---|---|---|---|
| 3,300,010 A | * | 1/1967 | Irish ..................... | 29/888.06 |
| 3,942,488 A | * | 3/1976 | Phillips et al. ............. | 123/53.6 |
| 4,213,721 A | * | 7/1980 | Aldridge, Jr. .............. | 408/54 |
| 4,227,292 A | * | 10/1980 | Kipling .................... | 29/402.04 |
| 4,232,437 A | * | 11/1980 | Fair ....................... | 29/888.011 |
| 4,451,186 A | * | 5/1984 | Payne ...................... | 408/54 |
| 4,652,186 A | * | 3/1987 | Sverdlin ................... | 408/81 |
| 4,789,279 A | * | 12/1988 | Rottler et al. .............. | 409/227 |
| 4,854,162 A | * | 8/1989 | Yerace et al. ............... | 73/119 R |
| 4,871,285 A | * | 10/1989 | Moore ....................... | 408/80 |
| 4,979,850 A | * | 12/1990 | Dompe ....................... | 408/72 R |
| 5,209,615 A | * | 5/1993 | Davis ....................... | 408/54 |
| 5,585,549 A | * | 12/1996 | Brevick et al. ............. | 73/49.7 |
| 5,590,466 A | * | 1/1997 | Harmand .................... | 29/888.011 |
| 5,655,278 A | * | 8/1997 | Harmand .................... | 29/33 R |
| 5,785,466 A | * | 7/1998 | Haynes ..................... | 408/80 |
| 5,836,725 A | * | 11/1998 | Harmand .................... | 408/1 R |
| 5,865,573 A | * | 2/1999 | Kress ...................... | 408/57 |
| 6,012,880 A | * | 1/2000 | Horn et al. ................ | 408/156 |
| 6,013,016 A | * | 1/2000 | Irvine et al. .............. | 483/1 |
| 6,510,732 B1 | * | 1/2003 | Liang et al. ............... | 73/117.3 |

* cited by examiner

Primary Examiner—Gregory Vidovich
Assistant Examiner—Essama Omgba
(74) Attorney, Agent, or Firm—Smith, Gambrell & Russell, LLP (57) ABSTRACT

Disclosed is a method and apparatus for quickly and accurately determining the amount of metal to be removed from the lower portion of an engine block when the engine is to be stroked, i.e. have a longer, replacement, connecting rod installed to increase the engine's cylinder displacement.

7 Claims, 8 Drawing Sheets

METHOD AND APPARATUS FOR ACCURATELY DETERMINING THE AMOUNT OF METAL TO BE REMOVED FROM A STROKED ENGINE BLOCK

This application claims the benefit of U.S. Provisional Appln. No. 60/283,676, filed on Apr. 13, 2001. The above-identified Provisional application is entirely incorporated herein by reference.

BACKGROUND OF THE INVENTION

The present invention relates to a method and apparatus for quickly and accurately determining the amount of metal to be removed from the lower portion of an engine block when the engine is to be stroked, i.e. have a longer, replacement, connecting rod installed to increase the engine's cylinder displacement.

FIELD OF THE INVENTION

Although there are many and varied methods for boring an engine block such as those disclosed in U.S. Pat. Nos. 4,451,186, 4,652,186, 4,789,279, 4,213,721, 6,012,880, 5,865,573 4,871,285, and the like; and for boring overhead cam engine cylinder heads, 5,836,725, 5,655,278 and the like, all of which are incorporated herein by reference, there is no method or apparatus in the prior art for determining the amount of metal to be removed from the lower portion of an engine block when the engine is to be stroked, other than trial and error.

DESCRIPTION OF THE PRIOR ART

The trial and error method of stroking an engine involves removing metal from each side of the lower portion of the block, installing the crankshaft, installing longer connecting rods, and then rotating the crankshaft to determine if enough metal has been removed from the block to allow crankshaft rotation with the longer rods without contact by the rods on either side of the block's lower portion. A connecting rod longer than the original rod requires a relatively greater open area in the lower engine block in order to rotate as compared to the open area provided in the original engine block for the original connecting rod. The prior art method involved numerous trial assemblies, much labor and time. It also made necessary the complete washing of the block and the parts after each assembly in order to insure that no loose metal remained on the rod-crankshaft surfaces and the crankshaft-block surfaces. There was also the possibility, when using the prior art trial and error method, of removing too much metal from the block, exposing a portion of the water jacket in the block and effectively destroying the block.

SUMMARY OF THE INVENTION

The present invention is a method and apparatus to quickly and accurately determine the amount of metal required to be removed from the lower portion of an engine block when the engine is to be stroked.

The apparatus of the present invention includes a first cylindrical member, a spacer or stroker bar, and a connector means for connecting the first cylindrical member, the spacer bar, and a first end of a piston connecting rod to be tested, wherein the spacer bar is positioned between the first cylindrical member and the piston connecting rod so as to center the connecting rod within a cylinder when the first cylindrical member is placed in a crank position, and wherein the first cylindrical member has a central hole which provides for rotatable movement of the spacer bar.

In another embodiment, the apparatus includes a cylindrical member, a spacer bar, a first connecting means for connecting the first portion and the spacer bar, and a second connector means for connecting the spacer bar to a first end of a piston connecting rod to be tested.

In yet another embodiment, the apparatus further includes at least one piston simulator which is connected to a second end of a piston connecting rod to be tested to align and center the connecting rod within the cylinder bore.

The present invention also concerns a method for determining the amount of metal to be removed from a stroked engine block. The method includes placing the first cylindrical member of the device described above into a crank position of an engine block, attaching to a spacer bar for movement of the spacer bar and attaching for movement to an end of the connecting rod to be tested, inserting the piston connecting rod under test into a piston cylinder, and then rotating the device in a reciprocal manner to determine whether the piston connecting rod under test contacts the engine block and if so, to thereby determine the amount of metal to be removed from the block.

BRIEF DESCRIPTION OF THE DRAWINGS

FIG. 8 further shows the additional apparatus in place at the other four crank positions;

DETAILED DESCRIPTION OF THE INVENTION

A first embodiment of the present invention is illustrated in FIGS. 3–6. The inventive apparatus includes a cylindrical member 22 which is shaped so as to fit in a crank position 21 of an engine block 20, particular reference is made to FIG. 3. The first member 22 is sized so that it will fit snugly in the crank position and has a central opening through which a connecting means, such as a shoulder bolt, will fit and freely rotate along its axial axis when placed in member 22. Preferably, member 22 is constructed from a durable plastic, rubber or the like. As will be appreciated by those of ordinary skill, the inventive apparatus includes several different sized members 22, depending upon the different sizes of engine blocks to be examined.

The apparatus further includes a spacer bar 23 and a connector 24. Connector 24 may be a bolt, an elongated screw, or the like, and advantageously is a shoulder bolt. Connector 24 attaches cylindrical member 22 and the spacer bar 23. Another connector 24 attaches a piston connecting rod 25 that is under test to the other end of the spacer bar 23. As will be apparent to those of ordinary skill in the art spacer bar 23 must be of an appropriate length to offset the end portion of connecting rod 25 from the axial axis of cylindrical member 22. The extent of offset by the spacer bar is the same as the offset from the primary axis of the engine crankshaft where the rod 25 would normally connect on the crankshaft. The spacer bar 23 should be of an appropriate width so as to center the piston connecting rod 25 within piston cylinder 26. Spacer bar 23 likewise has a hole for receiving connector 24 therethrough. Different length spacer bars 23 can be used for engines having different stroke lengths as long as the diameter and width of cylindrical member 22 ensures that the proper offset distance is provided between the axis of member 22 and the axis of the connecting rod end portion.

Figure 1:
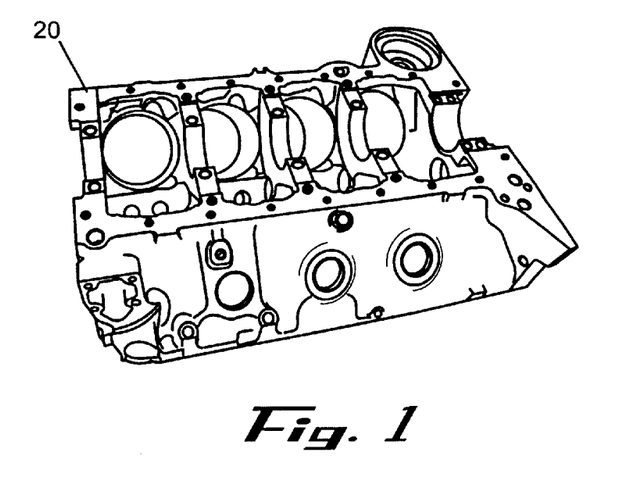
FIG. 1 is a bottom view of a bare V-8 engine block, i.e with the crankshaft, rods, pistons, etc. removed.
Figure 2:
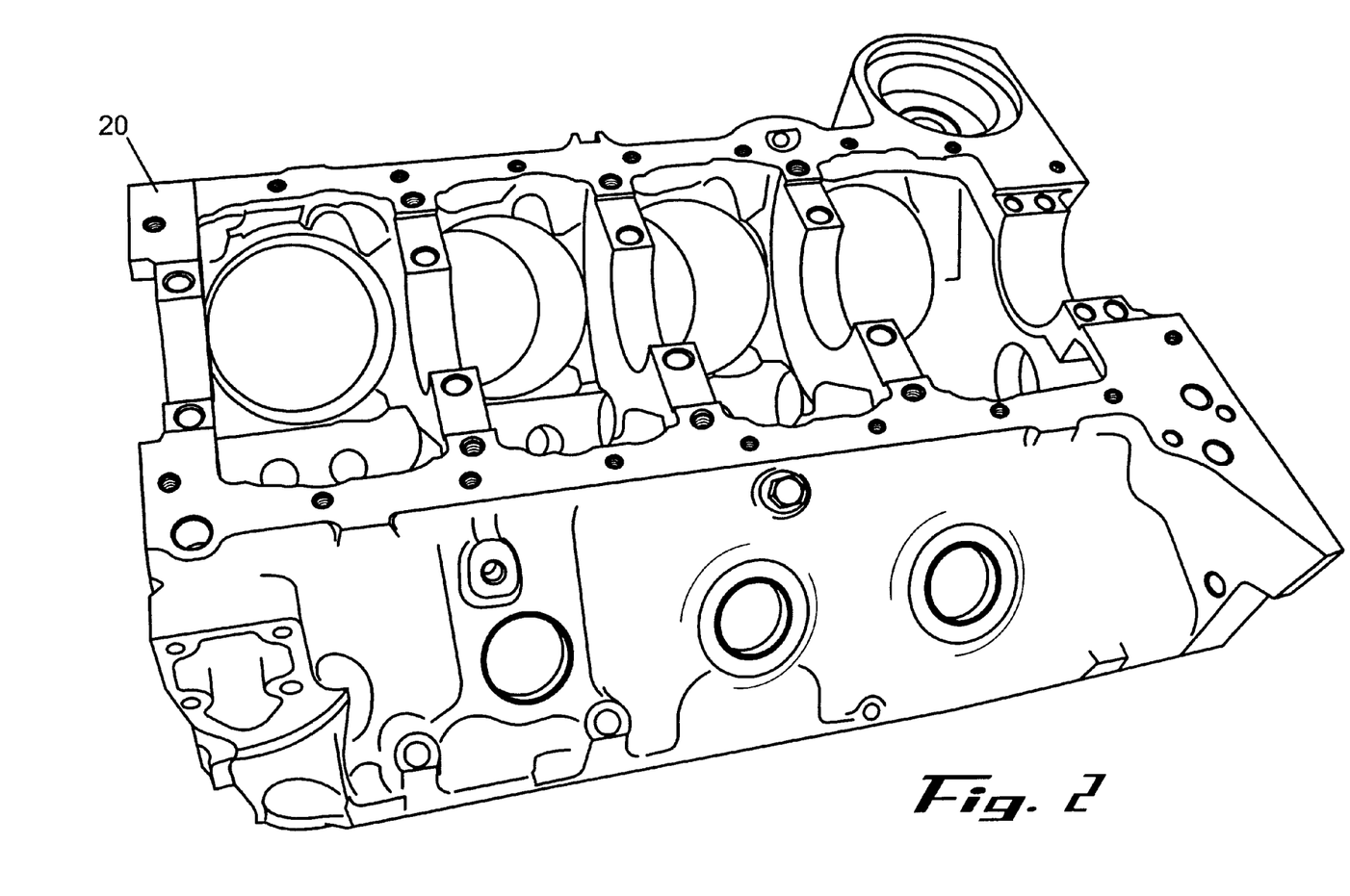
FIG. 2 is an enlarged view of the bare engine block shown in FIG. 1.
Figure 3:
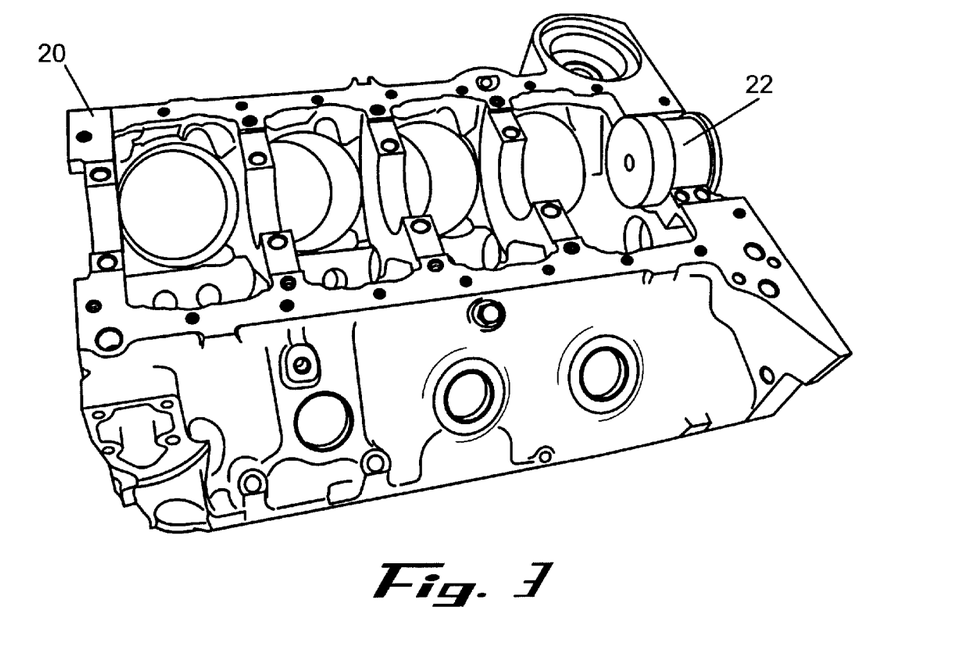
FIG. 3 is a bottom view of the bare engine block of FIG. 1 showing the first cylindrical member of the present apparatus placed at the number 1 crank position.
Figure 4:
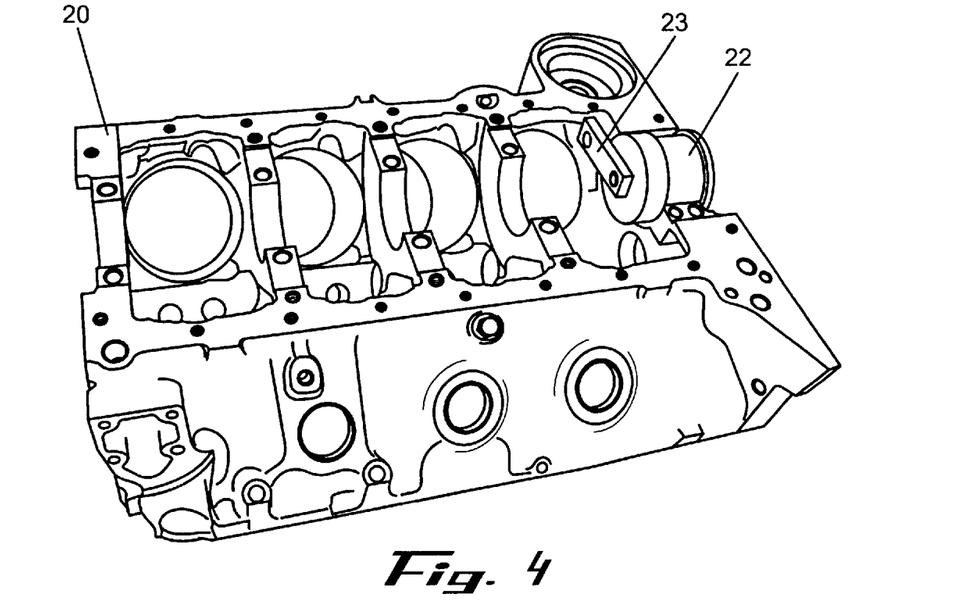
FIG. 4 is a bottom view of the bare block shown in FIG. 3 with the addition of a spacer or stroker bar to the first cylindrical member of the present invention at the number 1 crank position.
Figure 5:
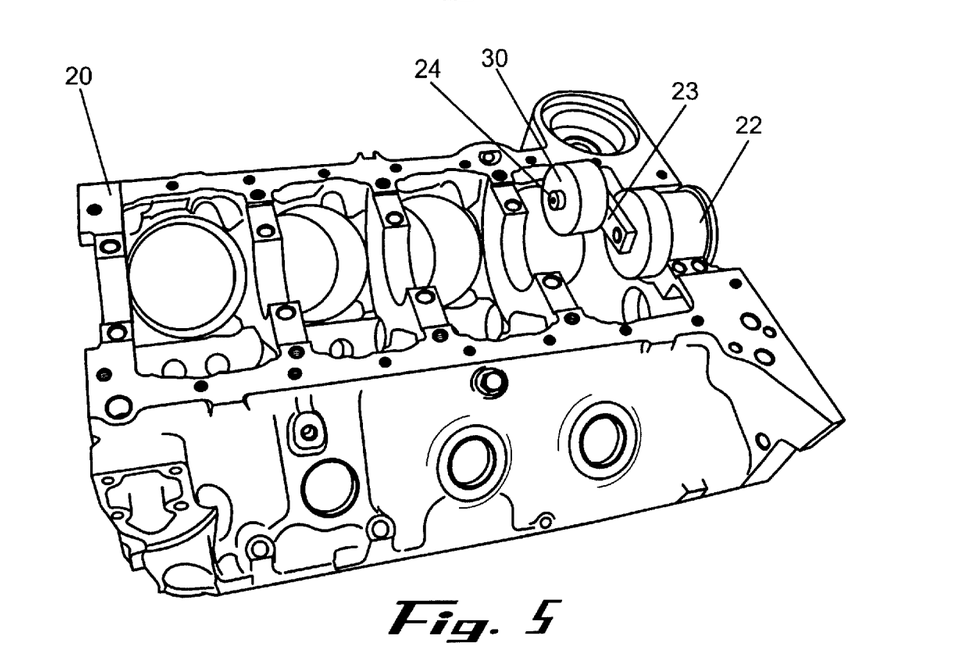
FIG. 5 is a bottom view of the bare block shown in FIG. 4 with the addition of a means to attach a connecting rod to the spacer bar.
Figure 6:
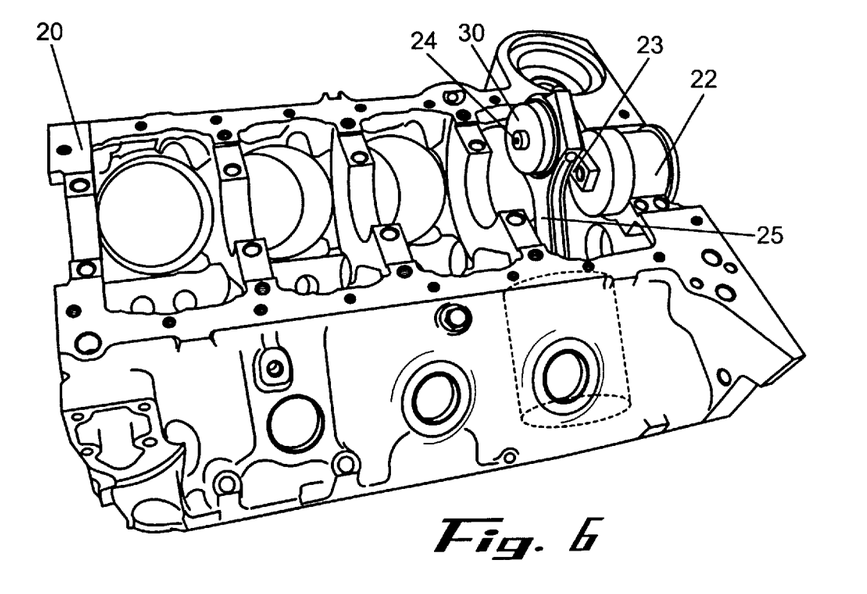
FIG. 6 is a bottom view of the engine block shown in FIG. 5 with a connecting rod attached to the attachment means.
Figure 7:
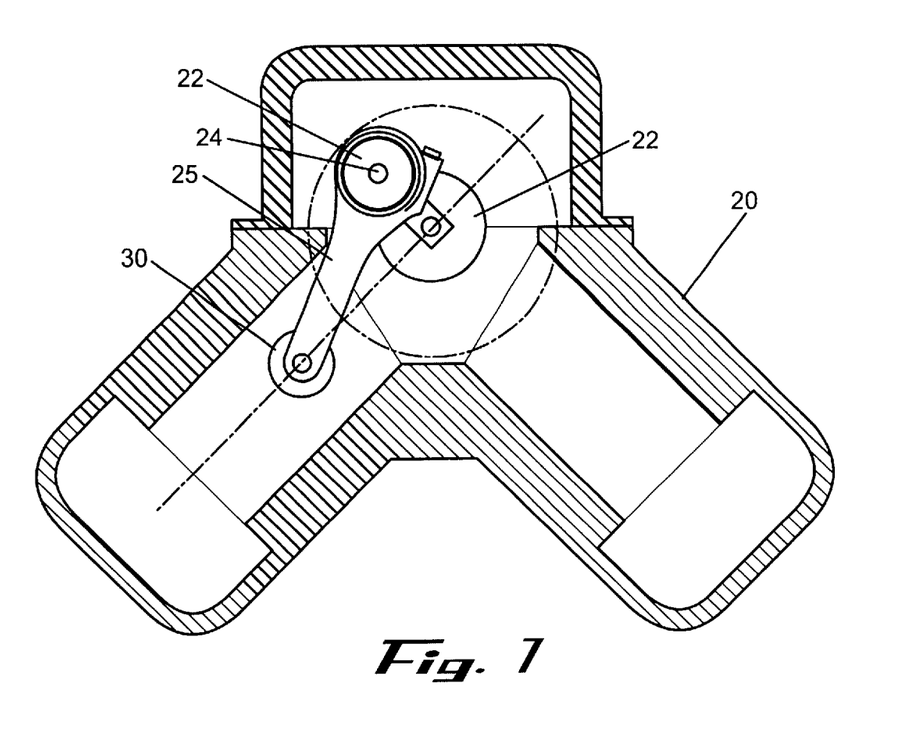
FIGS. 7 and 8 depict the apparatus and block shown in FIG. 6 as it rotates in order to determine the clearance between the longer connecting rod and each side of a block and to determine the amount of metal which must be removed from each side of the blocks adjacent the longer rod.
Figure 8:
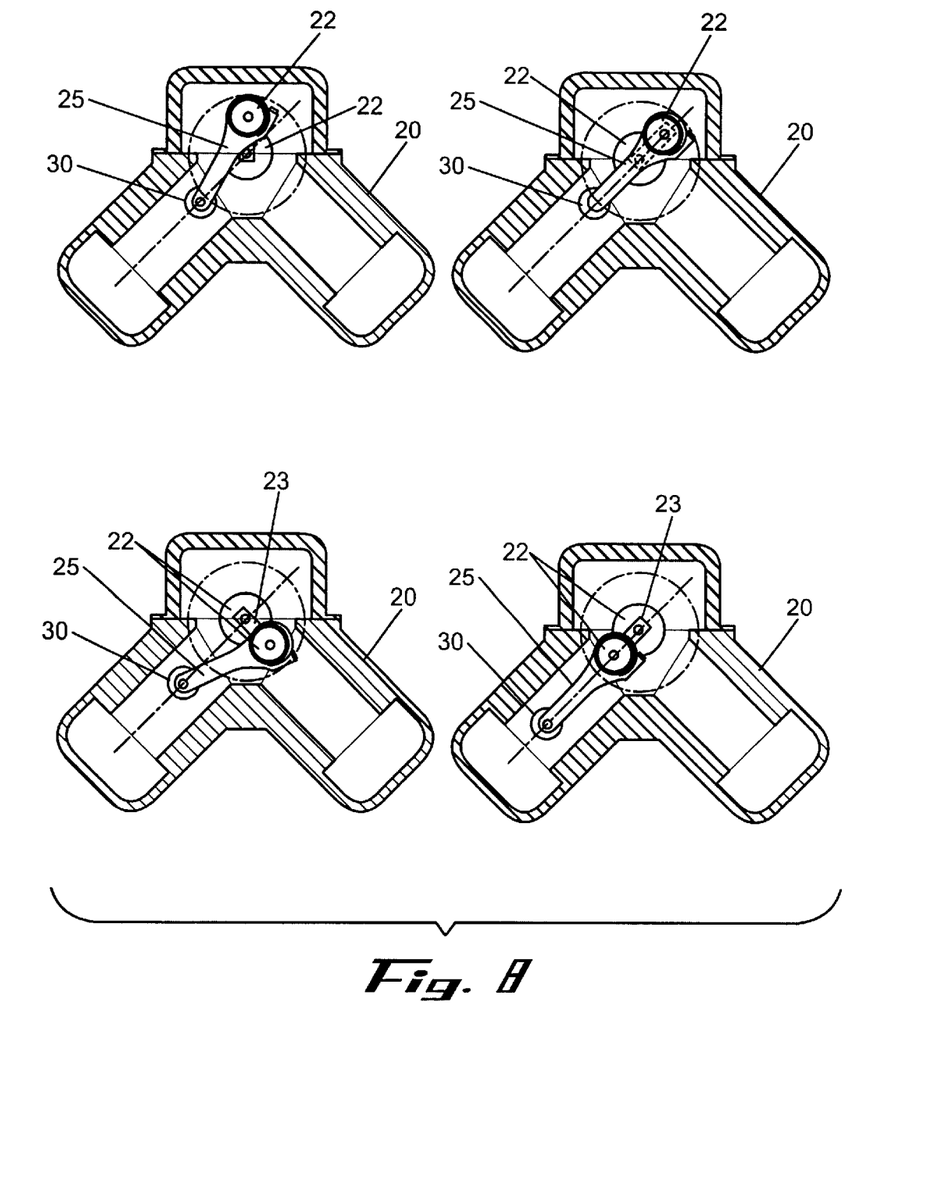

To determine the amount of metal to be removed from an engine to be stroked, the major components of the apparatus described above are assembled with the piston connecting rod 25 that is to be tested. According to the first embodiment, the spacer bar 23 is placed on one side of the cylindrical member 22, which is attached to the engine block by a bearing cap, with the piston connecting rod 25 being placed on the other side of the spacer bar 23. Connecting device 24 is received through aligned holes in the cylindrical member 22 and spacer bar 23, and through aligned holes of another cylindrical member 22 positioned in the opening of piston connecting rod 25 that ordinarily attaches to the crankshaft, as shown in FIG. 6. The apparatus may be assembled before or after the cylindrical member 22 is placed in crank position 21 of engine block 20. Piston connecting rod 25 is inserted into piston cylinder 26 of the engine block. Member 22 is then rotated, or, alternatively, moved reciprocally about its axial axis while the operator observes whether the piston connecting rod 25 contacts the engine block. Member 22, spacer bar 23 and connectors 24, when assembled with piston rod 25, and rotated within crank position 21, simulate the rotation of the crankshaft (not shown) of the engine within the block as member 22 is manipulated. If the rod 25 contracts the block 20 during rotation, the artisan then marks the contact area on the block for removal of metal. After an amount of metal has been removed, the apparatus is again assembled with rod 25 inserted into the position cylinder 26 of engine block 20 to confirm that sufficient metal has been removed. This testing and removal is repeated as necessary until there is no contact between rod 25 and block 20. Accordingly, the appropriate amount of metal can be properly and accurately removed from the engine.

Figure 9:
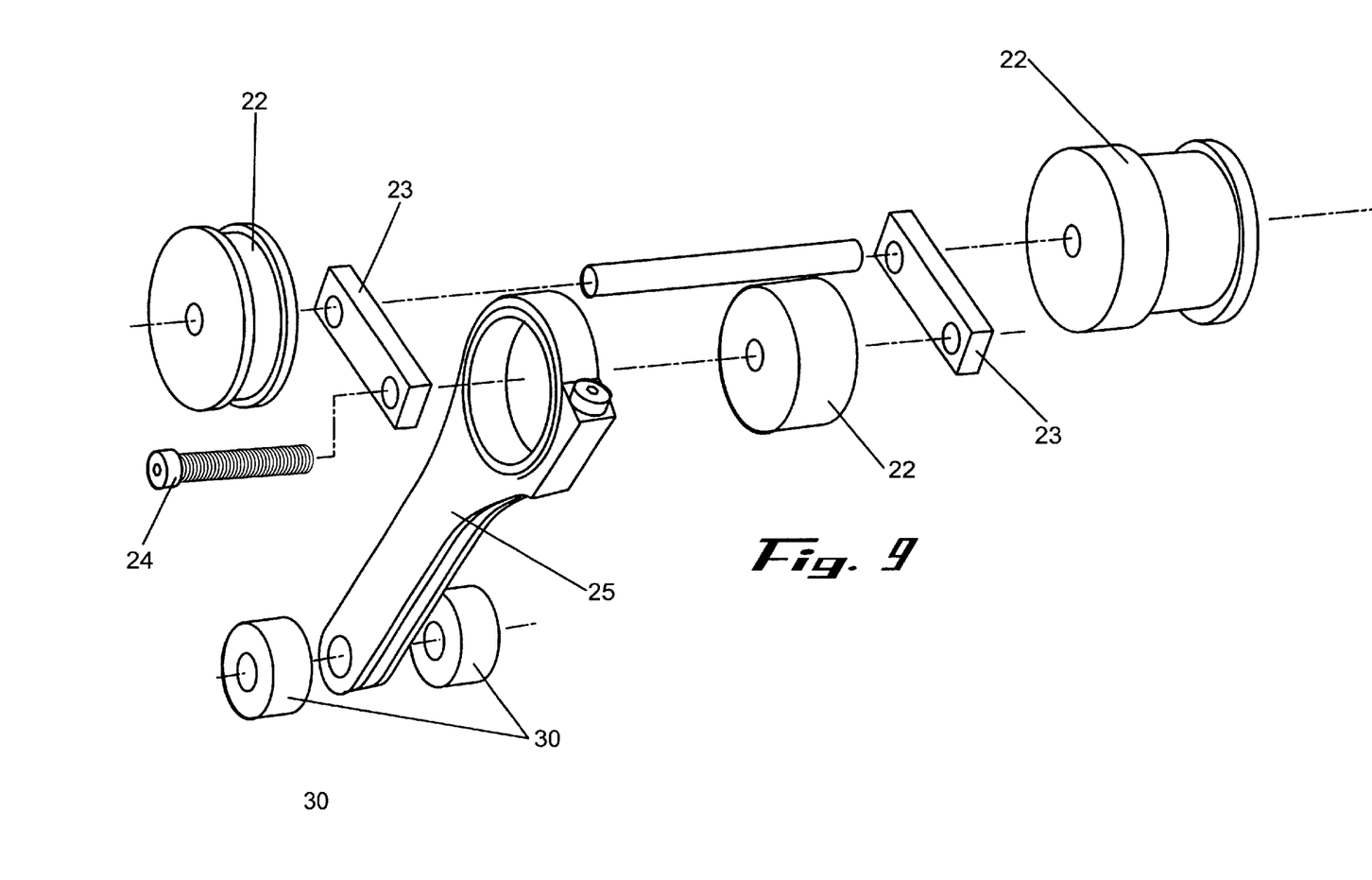
FIG. 9 is a view of the parts of the present invention separated to clearly show the individual portions of the present inventive apparatus, which in accordance with the above description would be, starting from the right side, the first cylindrical member, which is placed in a central crank position, above which is the spacer bar and to the left of which is the means to connect a connecting rod to the spacer bar, to the left of which is a cylindrical member which is placed in the number 1 crank position. The remaining items are shoulder bolts, washers, and piston simulators to align the connecting rod within the cylinder bore.
Figure 10:
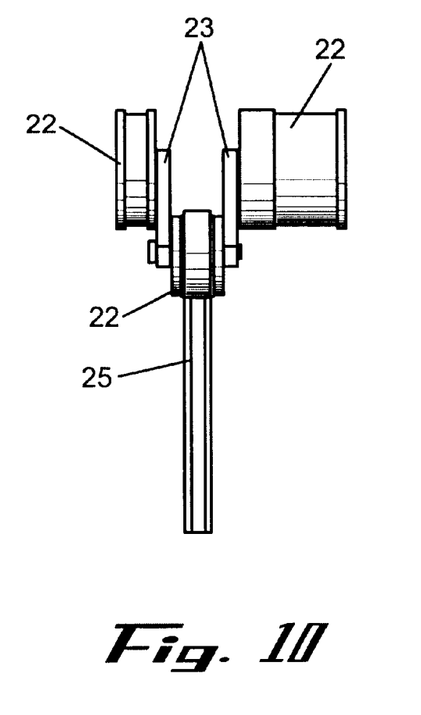
FIG. 10 is a side view of the apparatus present invention which employs a first connector means for connecting the first cylindrical member and the spacer bar, and a second connector means for connecting the spacer bar to a first end of a piston connecting rod to be tested.
Figure 11:
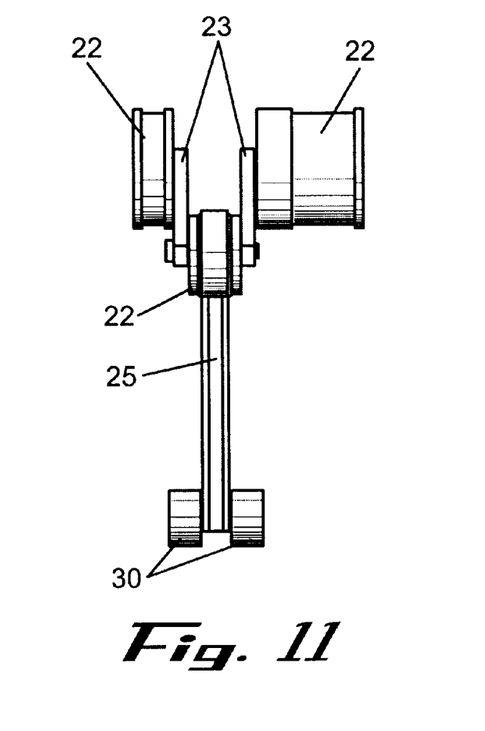
FIG. 11 shows yet another embodiment of the apparatus of the present invention including piston simulators connected to an end of the piston connecting rod opposite the end of the piston rod that is attached to the spacer bar.
Figure 12:
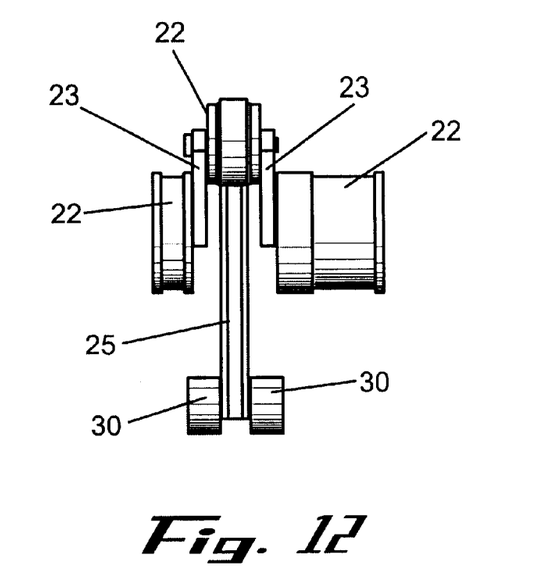
FIG. 12 further shows the apparatus in another crank position.
Figure 13:
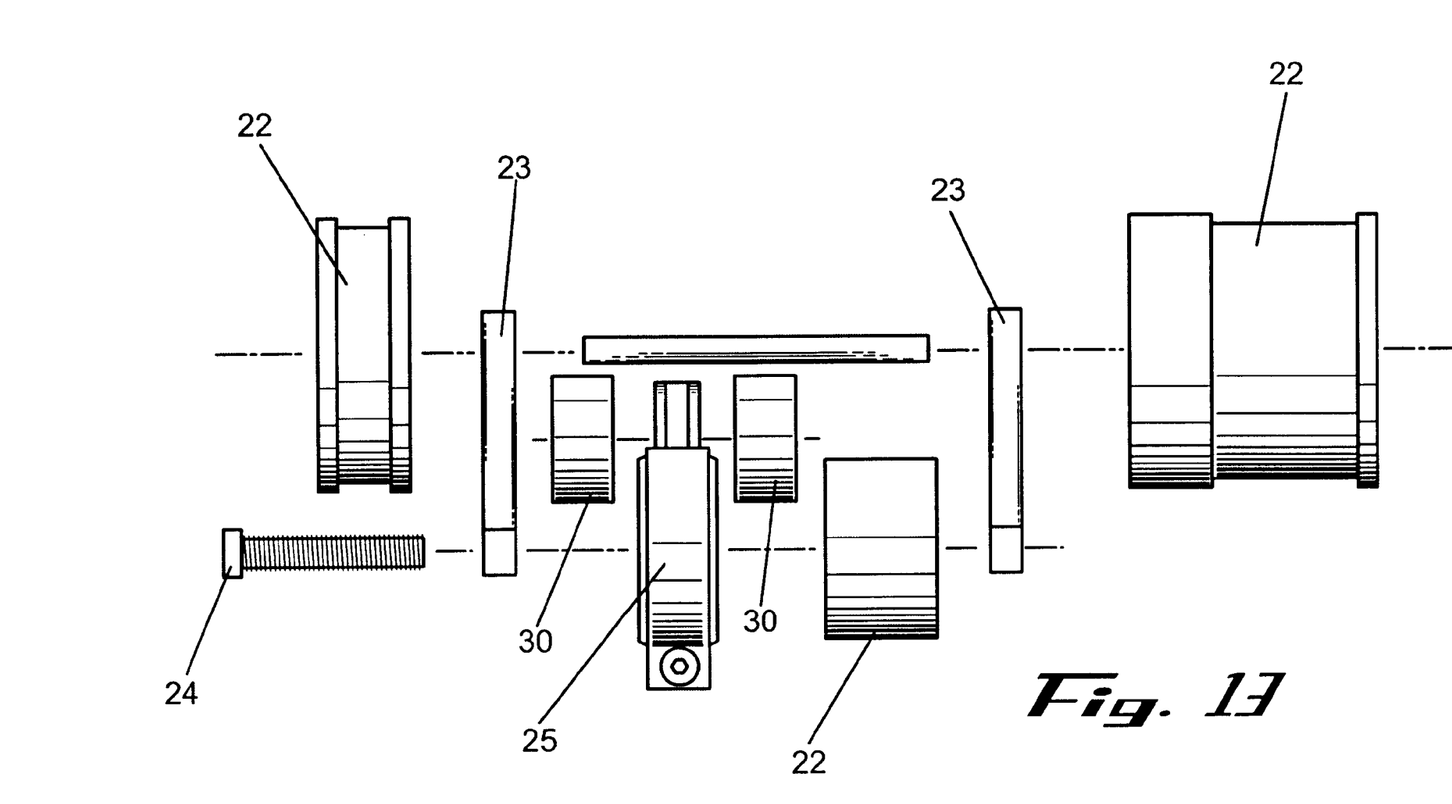
FIG. 13 is a top view of the parts show in FIG. 9.

FIG. 10 illustrates another embodiment of the invention. In this embodiment the apparatus comprises cylindrical member 22 which fits in the crank position of an engine block (not shown). Again, the member 22 should be of the proper size so that it will fit snugly when received in the crank position. The apparatus further includes spacer bar 23 and two connecting devices 24 for attaching member 22 and spacer bar 23 to a piston connecting rod 25. In this embodiment as in the prior embodiment discussed above, the first connecting device 24 is used to attach member 22 and spacer bar 23 firmly together, while the second connecting device 24 is used to attach spacer bar 23 to the connecting rod 25 under test. This embodiment of the apparatus is used in the same manner as described above for the first embodiment in determining the amount of metal to be removed from the lower portion of an engine block to adapt the block to longer piston connector rods 25 that is to be stroked. As depicted in FIG. 11, this embodiment includes all of the same components as described in the first embodiment above (as shown in FIGS. 3–6) with the addition of at least one piston simulating attachment piston simulator 30. Reference numbers corresponding to those used for the first embodiment will be used in describing this embodiment, except for the elements not present in the first embodiment. In this embodiment, two piston simulators are attached to the end of the piston connecting rod 25, opposite the end to which member 22 and spacer bar 23 are attached. The piston simulators 30 each have a protuberance 31 which protrudes from one of the flat sides of each of the piston simulators 30 (See FIG. 9). Protuberance 31 allows the piston simulator to fit within the piston connecting rod 25 by extending through the opening at the piston-connection end portion of the rod. The protuberance 31 can be threaded for attachment or formed such that it is pressure fitted and can be snugly pushed into the end of piston connecting rod 25. Each piston simulator 30 preferably is constructed from the same or material similar to that of the cylindrical member 22. Again, this embodiment is used in the same manner as described above for the other embodiments when used in the present method for determining the amount of metal (if any) to be removed from the lower portion of an engine block that is to be stroked.

As shown in FIG. 9, spacers 27, may be inserted between simulators 30 in order to correctly center and align the connecting rod within cylinders of different bore sizes. As shown in FIG. 9, connectors 24 are advantageously shoulder bolts which may also employ spacers 27 in order to exactly fit within the width of different sized cylindrical members 22.

As discussed above, the first cylindrical member fits inside the main bearing cap of an engine and may be of different sizes to match the crankshaft sizes of different engines. The first cylindrical member contacts the block at the bearing surface and is held in place by the bearing cap being tightened. Each cylindrical member has a central hole through which a connector, such as a shoulder bolt, is inserted. The shoulder bolt may have washers or spacers to allow the correct length of threaded bolt to extend through the cylindrical member to be threaded into the opening in the spacer bar. The length of the spacer bar will vary depending upon the length of the rod and the desired increase in the stroke of the engine. The end of the spacer bar opposite the end that attaches to the first cylindrical member attaches in the same member to another, second, cylindrical member which is sized to fit in the opening of the connecting rod which normally attaches to a piston. The connector, with or without washers or shims, fits through the central opening of the first cylindrical member which snugly fits within the opening of the connecting rod which normally attaches to the crankshaft. The second cylindrical member is attached to the opposite end of the spacer bar from the first cylindrical member, held in place on the block by the bearing cap, in the same manner, i.e. by threading into the opening in the spacer bar. The combined width of the cylindrical member attached to the block and the spacer bar centers the rod in the cylinder bore. The two piston simulators further align and maintain the connecting rod in the center of the cylinder bore. The connectors are free to move and rotate within the first cylindrical member held in place on the engine block by the bearing cap and the second cylindrical member snugly fit within the connecting rod opening. In operation when the apparatus is moved both the connectors rotate within the cylindrical members and the connecting rod moves up and down within the cylinder bore. As previously stated when an engine is stroked, the connecting rod length is increased, thereby increasing the arc traversed by the connecting rod as it rotates on the crankshaft. In many cases this increased arc leads to contact of a portion of the connecting rod with the lower portion of the engine block which necessitates that metal be removed before the engine can be assembled and operated. The present invention allows for an accurate determination of the amount of metal to be removed without the prior art method's necessity of completely assembling the crankshaft, rod, and pistons and turning the crankshaft in order to determine if a portion of a connecting rod would contact the block. The prior art methods often were very labor intensive in that the engine had to be assembled and disassembled a number of times. In addition the engine block could be irreparably damaged or weakened such that it would be unusable if too much metal was removed.

Although the present invention is described and shown herein as it relates to a V-8 engine, it may be used to quickly and accurately determine the amount of metal to be removed from the lower portion of an engine block having any straight or V configuration, and having any number of cylinders. The portion of the apparatus which is placed into the number 1 and other crank positions should conform to the dimensions of the original, or replacement crankshaft, such as circumference, diameter or radius so as to precisely fit in the crank positions in order to accurately determine the amount of metal to be removed from a block. The portions of the apparatus of the present invention may be formed of any cast able, machinate, extrudable or the like material. Advantageously, the apparatus is made of polymerized material, plastic or metal. Preferably the apparatus, other than the spacer bar which is preferably metal, is manufactured of a plastic or polymerized material. The various portions of the present invention apparatus may be made of the same, like, or dissimilar materials.

It will be understood that many possible embodiments may be made of the invention without departing from the scope thereof. The above description and the accompanying figures are to be interpreted as illustrative of the present invention and not as a limitation thereof.

What is claimed is:

1. An apparatus for determining an amount of metal to be removed from a lower portion of the block of an engine that is to be stroked comprising:
   simulator means for simulating operation of a crankshaft within the engine block; and connector means for connecting a piston connecting rod under test to said simulator means such that the connecting rod enters a cylinder of the engine and move reciprocally therein in response to movement of said simulation means, wherein said simulator means includes a spacer bar for offsetting an axial axis of the piston connecting rod from an axial axis of said cylindrical member.

2. An apparatus for determining an amount of metal to be removed from a lower portion of the block of an engine that is to be stroked comprising:
   a first cylindrical member receivable within a crank position of the engine, and having a connection means rotatable therein through the center of and for connection to one end of a spacer bar; and
   a second cylindrical member having a connection means rotatable therein through the center of and for connecting to the other end of the spacer bar and a piston connector rod under test;
   wherein said spacer bar offsets an axial axis of the piston connector rod from an axial axis of said first and second cylindrical members.

3. The apparatus of claim 2 wherein the first cylindrical member is firmly attached in a crank bearing position of the engine block and the second cylindrical member is snugly fittingly attached to the connecting rod that is to be tested.

4. The apparatus of claim 3 wherein the first cylindrical member to is connected to one end and one side of the spacer bar and the second cylindrical member connects the piston connecting rod to the opposite end and opposite side of the spacer bar.

5. The apparatus of claim 2 wherein at least one piston simulator is attached to the end of the connecting rod opposite the end to which the spacer bar is attached.

6. The apparatus of claim 2 wherein the cylindrical member and the spacer bar have complimentary holes and the connecting means is a bolt threaded through said holes.

7. The apparatus according to claim 2 wherein a spacer bar width centers the piston connecting rod in a cylinder of the block.

* * * * *